ns Patent [19]
Germano

[11] 3,718,509
[45] Feb. 27, 1973

[54] COATED METAL AND METHOD
[75] Inventor: Victor V. Germano, Mentor-on-the-Lake, Ohio
[73] Assignee: Diamond Shamrock Corporation, Cleveland, Ohio
[22] Filed: Feb. 3, 1971
[21] Appl. No.: 112,429

Related U.S. Application Data

[63] Continuation-in-part of Ser. No. 729,932, May 17, 1968, abandoned.

[52] U.S. Cl. ............... 148/6.2, 204/181, 148/31.5, 219/118, 219/148
[51] Int. Cl. ............................................. C23f 7/26
[58] Field of Search ............. 204/181; 148/6.2, 6.16; 219/118, 148, 78

[56] References Cited

UNITED STATES PATENTS

| | | | |
|---|---|---|---|
| 3,318,716 | 5/1967 | Schuster | 148/6.2 X |
| 3,502,511 | 3/1970 | Forsberg | 148/6.15 R |
| 3,454,483 | 7/1969 | Freeman | 148/6.15 R X |
| 3,325,432 | 6/1967 | Kellert et al. | 148/6.2 X |
| 3,242,130 | 3/1966 | Jackopin | 117/75 X |
| 3,351,504 | 11/1967 | De Hart | 148/6.2 X |
| 3,464,906 | 9/1969 | Ridley | 204/181 |
| 3,408,278 | 10/1968 | Stoodley | 204/181 |
| 2,846,342 | 8/1958 | Curtin | 148/6.16 |

*Primary Examiner*—Ralph S. Kendall
*Attorney*—Roy Davis, William A. Skinner and John J. Freer

[57] ABSTRACT

A composite coating provides enhanced corrosion protection for metal substrates, can maintain weldability where otherwise desirable and provide a surface for receiving electrocoat paint. The undercoating on the surface of the substrate is the residue obtained from heating an applied corrosion-resistant, hexavalent-chromium-containing coating composition, which residue is in intimate mixture with pulverulent metal. The coating over such residue results form curing an applied topcoat composition comprising additional hexavalent-chromium-containing coating composition.

19 Claims, No Drawings

COATED METAL AND METHOD

CROSS REFERENCE TO RELATED APPLICATION

This application is a continuation-in-part of copending U.S. application Ser. No. 729,932 filed May 17, 1968 now abandoned.

BACKGROUND OF THE INVENTION

Hexavalent-chromium-containing coating compositions for metal substrates are applied to metal surfaces from liquid compositions containing hexavalent chromium, often supplied by chromic acid, to typically impart some corrosion resistance and improved pain adhesion to the metal surface. Such coatings have been shown for example, in British Pat. No. 1,033,399 and in U.S. Pat. Nos. 2,559,812, 2,768,104, 2,777,785, 2,846,342, 2,901,385, 2,902,390, 3,063,877, and 3,346,522, and 3,382,081. These coating compositions may contain some trivalent chromium, or the coatings can form trivalent chromium compounds during application and/or curing. Coatings thus prepared tend to be non-porous and somewhat amorphous in nature. They can provide initial, limited corrosion protection for the metal substrate, but under rigorous conditions, such as extended exposure to moist, salty air, such protection is of undersirably short duration.

It would also be highly desirable, for example in the automotive industry, to have a coating for metal which can be easily and economically applied and that will offer corrosion resistance even after metal forming, and hence before welding. Thus such a coating needs to be highly adherent, must not deleteriously retard substrate weldability, and should most desirably impart corrosion resistance even when the coated metal is scratched to the substrate. Moreover, the general welding operation for high volume production lines is electrical resistance welding, that is typically seam or spot welding, the specifications for which are most usually not met by coatings that would be readily fusion welded, e.g., arc welded. In addition, such desirable coatings must provide a suitable base coat for subsequent painting, especially electrocoating, even after metal forming and welding.

SUMMARY OF THE INVENTION

It has not been found that hexavalent-chromium-containing coating compositions for metal substrates can offer enhanced corrosion protection for such substrates when the residues obtained thereon, from the curing of such compositions, are in intimate mixture with pulverulent metal and, further, such mixture is provided with a topcoating of additional residue obtained from subsequently applied and cured -hexavalent-chromium-containing coating composition. Additionally, such a coating augments adhesion for subsequently applied paint topcoatings, particularly electrocoats and, where the substrate is a weldable metal substrate, such a coating provides a surface which can be selected to retain the desirable weldability of the substrate.

Broadly, the present invention is directed to a metal substrate having at the surface thereof an adherent, corrosionresistant coating which comprises: an undercoating comprising not substantially above about 500 milligrams per square foot of coated metal substrate of the residue from a hexavalent-chromium-containing coating composition for metal substrates containing hexavalent-chromium-providing substance and reducing compound therefore, said residue being in intimate mixture with at least about 10 milligrams per square foot of coated metal substrate of pulverulent metal selected from the group consisting of zinc, manganese, aluminum, magnesium, mixtures thereof, and alloys of same; and, a topcoating, on such undercoating, which comprises not substantially above about 500 milligrams per square foot of coated metal substrate of the residue from a hexavalent-chromium-containing coating composition for metal substrates. The residue of such undercoating and the residue of such topcoating are established by heating the metal substrate at a temperature, and for a period of time, sufficient to vaporize volatile substituents from the coating composition.

Additionally, the present invention relates to preparing a metal substrate exhibiting the above-described adherent, corrosion-resistant composite coating and including preparation of a substrate for welding and/or electrocoating. It is further directed to the production of welded and/or electrocoated articles.

The metal substrates contemplated by the present invention are any metal substrates to which there may be applied a hexavalent-chromium-containing coating composition. For example, such metal substrates may be aluminum and its alloys, zinc and its alloys, copper and cupriferous, e.g., brass and bronze. Additionally, exemplary metal substrates include cadmium, titanium, nickel and its alloys, tin, lead, chromium, magnesium and alloys thereof, and for weldability, preferably a ferrous metal substrate such as iron, stainless steel, or steel such as cold rolled steel or hot rolled and pickled steel. All of these for convenience are usually referred to herein simply as the "substrate."

For convenience, the hexavalent-chromium-containing coating compositions are often referred to herein as "coating compositions" and the "residue" is obtained after application and drying, including drying with heating, of such compositions on a metal substrate. Likewise, for convenience, the material remaining provides an "intermediate coated substrate" and the second coating, or "composition topcoating" is thereafter applied.

DESCRIPTION OF THE PREFERRED EMBODIMENTS

The corrosion-resistant, hexavalent-chromium-containing coating compositions often contain chromic acid as the hexavalent-chromium-providing substance. But such chromium can be supplied by a salt such as ammonium dichromate, e.g., as taught in U.S. Pat. No. 2,846,342, or by sodium or potassium salts as shown in U.S. Pat. No. 2,559,812, or by substances such as calcium, barium, magnesium, zinc, cadmium, and strontium dichromate as shown for example in U.S. Pat. No. 2,901,385, and/or British Pat. No. 1,033,399. Additionally, the hexavalent-chromium-providing substance might be a mixed chromium compound, i.e., include trivalent chromium compounds as shown in U.S. Pat. No. 3,185,596. Although the coating compositions might contain as little as about 0.25 weight percent of hexavalent chromium, expressed as $CrO_3$, and may contain as much as about 500 grams per liter of composition of hexavalent chromium, expressed as $CrO_3$, such compositions typically contain from several weight percent up to about 100 grams per liter of hexavalent chromium, expressed as $CrO_3$.

In addition to a hexavalent-chromium-providing substance, these coating compositions contain a reducing compound which is typically a polyalcohol or organic acid and many of these useful reducing compounds have been shown for example in U.S. Pat. Nos. 2,559,812, 2,901,385, and 2,777,785. The reducing agent or component is usually present as a single compound which is often organic but can be an inorganic substance, such as potassium iodide, or a hypophosphite reducing agent as shown in U.S. Pat. No. 2,846,342. Organic reducing agents may be very low molecular weight agents such as formaldehyde, disclosed in U.S. Pat. No. 3,063,877 or such high molecular weight materials as polyacrylic acid compounds as taught in U.S. Pat. No. 3,185,596. The reducing agent can be the solution media of the coating composition, as shown in U.S. Pat. No. 2,927,046 and such reducing components may be preformed and stored prior to use, as taught for example in U.S. Pat. No. 3,346,522. The reducing agents may not be added to the coating composition directly, but rather supplied to a metal surface already containing an applied chromic acid solution, i.e., the agents are applied during drying of the chromic acid solution, on the metal surface as shown in U.S. Pat. No. 2,768,103. Combinations of reducing agents may be used, for example, the combination of succinic acid or other dicarboxylic acid of up to fourteen carbon atoms, in mixture with one another, which acids may also be used alone, or in further mixture with one or more substances such as aspartic acid, acrylamide, succinimide, $C_4$–$C_{14}$ aliphatic ketocarboxylic acids, or $C_3$–$C_{18}$ unsaturated aliphatic carboxylic acids. Such dicarboxylic acids and combinations have been disclosed in U.S. Pat. No. 3,382,081, and for enhanced corrosion resistance and retained weldability for the coated substrate, are the preferred agents for the undercoating composition.

Additional substances which may be included in such coating compositions, but, for retaining substrate weldability and for providing a coated surface for receiving an electrocoat paint should be present in very minor amounts, include phosphoric acid or a compound of phosphorous, such as a metallic dihydrogen phosphate, and the phosphate can form part of the coating, as taught in U.S. Pat. No. 2,901,385. The total of phosphorous compounds for subsequent welding or electrocoating should not be present in an amount substantially above about 15 grams per liter of composition.

Other useful compounds often found in hexavalent-chromium-containing coating compositions are manganese compounds which assist in extending the useful life of the coating bath, as disclosed in U.S. Pat. No. 2,777,785, or very minor amounts of pigment, e.g., those as disclosed in British Pat. No. 1,033,399, as well as resinous materials which have been shown in U.S. Pat. No.3,346,522. However, the presence of more than very minor amounts of such materials, and especially such materials in combination, can deleteriously affect subsequent weldability or application of electrocoat paint. Thus for subsequent electroconductivity, such compositions should contain 0–40 grams per liter of resin, i.e., are substantially resin-free, contain 0–40 grams per liter of pigment, and 0–40 grams per liter of bath extending agents. Such coatings that will be subsequently topcoated are preferably pigment-free.

Additional coating composition components may include a very limited amount of one or more organic and inorganic acids to maintain composition acidity as taught in British Pat. No. 972,072, as well as surface active agents. Such agent may typically be a hydroxyl-containing hydrocarbon ether which includes the alkyl ethers of alkylene glycols, such a butyl ether or propylene glycol, the oxyalkyl ethers of alkylene glycols, e.g., 1-butoxyethoxy-2-propanol, fatty alcohol polyoxyalkylethers, alkylphenol polyoxyalkyl-ethers such as polyoxyethylated nonylphenols, and polyalkylene glycols, e.g., tetraethylene glycol. Other suitable surface active agents which may be used include products prepared from waste sulfite liquors such as lignin sulfonic acids and products from pine wood distillation, e.g., pine oil. To often additionally augment salt spray resistance of the coated substrate, such coating compositions can contain up to about 20 grams per liter of metallic ions, and typically between about 1–10 grams per liter of such ions. These metallic ions include calcium, ferrous, zinc, cobaltous, cupric, manganous, nickelous, and mixtures thereof. However, caution should be taken when introducing such ions into the dispersion to avoid the commensurate introduction of chloride and sulfate ions, since they can act to retard salt spray resistance, and preferably all such substances are present and in minor amounts of about 10 grams per liter or less.

Substantially all of the hexavalent-chromium-containing coating compositions are water based but other liquid materials are used, and typically these are alcohols, e.g., tertiary butyl alcohol, and this particular alcohol has been used in conjunction with high boiling hydrocarbon solvents to prepare the liquid medium for the coating composition, as taught in U.S. Pat. No. 2,927,046, or cholrinated solvents as taught in U.S. Pat. No. 3,437,531. In selection of the liquid medium, typically economy is of major importance, and thus such medium most always contains readily commercially available volatile liquids, i.e., liquids boiling at or below 100°C. at atmospheric pressure. Often the coating compositions are solutions but may be dispersions, e.g., contain a water dispersible reducing agent such as water dispersible polyacrylic acid compounds.

These coating compositions are usually applied to a metal surface either by dipping the article into the coating composition or by spraying the composition onto the metal surface, which surface can be a preheated metal surface to assist in the curing of the coating, as taught in U.S. Pat. No. 2,846,342. However, the coating composition may be used as an electrolytic bath to coat a metal surface employed as a cathode in the bath, as shown in British Pat. No. 972,072. The coating composition may be applied to the metal surface after an etch, e.g., a nitric acid etch, as taught in U.S. Pat. No. 2,768,103, or the reducing agent may be applied after the application of the hexavalent-chromium-containing solution and during drying of such solution on the metal surface, as mentioned hereinabove. The coating composition may be applied from a heated bath, for example one heated up to 200°F. as taught in U.S. Pat. No. 2,768,104. Moreover, after application and curing of the composition the heated metal may be desirably quenched in a solution of chromic acid in water as taught in U.S. Pat. No. 2,777,785.

After application of these coating compositions to a metal substrate, and so long as the undercoating is in intimate mixture with the pulverulent metal, each coating after application may be heated, and the preferred temperature range for the subsequent heating, which is also often referred to as curing and which may be preceded by drying such as air drying, is from about 200°F., as taught for example in U.S. Pat. No. 3,185,596, but more typically from about 212°F., e.g., as taught in British Pat. No. 972,072. Such an elevated substrate temperature may be attained by preheating the metal prior to application of the coating composition as shown in U.S. Pat. No. 2,846,342. However, such curing temperatures do not often exceed a temperature within the range of about 450°-550°F. to avoid charring or other adverse coating affects as taught in U.S. Pat. No. 2,777,785. At the elevated curing temperatures the heating can be carried out in as rapidly as about 2 seconds or less but is generally conducted for several minutes at a reduced temperature to provide the most corrosion-resistant and adherent coatings. Also, the intermediate coated substrate may only be dried, which may be forced air drying or drying without heating, and to a condition of ostensible dryers to the touch, followed by application of composition topcoating and subsequent heating providing curing for the total coating composite.

The resulting weight of the undercoating residue on the metal substrate may vary to a considerable degree, but the residue will most typically always be present in an amount supplying above about 5 milligrams per square foot of chromium, expressed as chromium and not $CrO_3$. For electroconductivity, the topcoating residue contains below about 25 milligrams per square foot or chromium, expressed as chromium an not $CrO_3$, and preferably for enhanced electroconductivity, for example, for extended electrical resistance spot welding, the topcoating residue contains below about 20 milligrams per square foot of chromium. Also, if the coated metal substrate is to be subsequently formed, the residue from each coating should contain not substantially above about 150 milligrams per square foot of chromium as the coating may be subjected to cracking or crazing during forming operation. For articles where subsequent forming is not contemplated, and extended corrosion resistance is of chief concern, while most desirable electroductivity need not be achieved, such residue from each coating may contain up to about 500 milligrams per square foot of chromium.

In some instances, for enhanced corrosion protection of the substrate, the metals for the pulverulent metal are the less noble metals, i.e., magnesium, aluminum, manganese, and zinc, as well as their alloys, e.g., zinciferous and aluminiferous metals, and additionally include mixtures of any such metals. Preferably, for efficiency and economy, such metal is zinc, or aluminum, or their mixtures.

The pulverulent metal can be flake, or powder, or both but should have particle size such that all particles pass 100 mesh and a major amount pass 325 mesh ("mesh" as used herein is U.S. Standard Sieve Series). Advantageously, for preparing a coated substrate having augmented uniformity in the distribution of the pulverulent metal, as well as enhanced bonding of metal to the substrate, the pulverulent metal employed is one wherein essentially all particles, e.g., 80 weight percent or more, pass 325 mesh.

When the pulverulent metal is present in the coating composition, the composition should be made up with an amount of such metal sufficient to supply not substantially above about 1,000 grams of metal per liter of coating composition liquid medium. The presence of greater than about 1,000 grams per liter of pulverulent metal is undesirable, for example, can add expense without a significant increase in corrosion protection for the coated substrate. Preferably, for economy and desirable coating characteristic, the composition contains between about 50-500 grams of metal per liter.

Also, for such pulverulent metal containing coating compositions, the chromium, expressed as $CrO_3$, should not exceed more than about 200 grams per liter of composition medium. Greater than about 200 grams per liter of chromium is uneconomical and can deleteriously detract from the characteristics of the coated metal surface, for example, the most desirable corrosion resistance for the coated metal substrate. Further, such composition should have a weight ratio of chromium, expressed as $CrO_3$, to pulverulent metal of at least about 0.08:1.

A ratio of less than about 0.08:1 may not provide sufficient chromium in the coating to achieve augmented bonding of the pulverulent metal to the metal substrate. A ratio of as great as about 0.2:1 may be achieved, but should be at metal concentrations of less than about 100 grams per liter. As the metal content approaches about 1,000 grams per liter and thus the chromium content can approach about 200 grams per liter the upper weight ratio of chromium, expressed as $CrO_3$, to pulverulent metal approaches 0.2:1. It has been found that the very concentrated coating compositions containing between about 500-1,000 grams per liter of pulverulent metal have particular utility in the coating of small parts as opposed to application to large substrate areas such as metal coils. Typically, the compositions containing pulverulent metal have above about 30 grams per liter of liquid medium of chromium, expressed as $CrO_3$, and below about 100 grams per liter of chromium.

The coating ingredients may be combined into separate packages, e.g., one containing the hexavalent-chromium-providing substance in a liquid medium, and the other package being a dispersion in liquid medium of pulverulent metal, each package additionally containing some surface active agent. Such separate packages may be blended together before application to the metal substrate or may be separately or simultaneously applied.

The pulverulent metal can be applied dry to the metal substrate, for example by simply brushing or blasting the metal onto the substrate, or by electrostatic spraying. When applied separately, it can be applied dry or applied as a dispersion in volatile liquid, for example, water or readily volatile alcohol, or other volatile organic liquids such as benzene, with water being preferred for economy. For economy, such dispersions advantageously contain at least about 5 grams per liter of dispersed metal, to avoid subsequent uneconomical evaporation of large amounts of volatile liquid, and may contain above 90 weight percent of pulverulent metal in the case of a dense metal such as zinc, i.e., above 65 volume percent of such metal.

Such dispersions and liquid compositions, i.e., the hexavalent-chromium-containing liquid composition additionally containing, or free from, pulverulent metal, may be applied to the metal substrate by any conventional method for coating a substrate with a liquid, for example, dip coating, roller coating or reverse roller coating, curtain coating, airless spray, rotary brush coating, pressure spray or combinations of such techniques as, for example, spray and brush techniques. However, for usual spray application, the amount of pulverulent metal in a dispersion for a dense metal such as zinc, does not exceed about 500 grams per liter. Typically the hexavalent-chromium-containing liquid composition is applied to a metal surface by simply dipping the metal article into the composition.

Where the pulverulent metal is applied as a separate dispersion such dispersion may be applied even after the application of the liquid composition, so long as such composition has not been cured. The metal surface can be a preheated metal surface to assist in the curing of the composition, or such liquid composition or dispersion may be applied to the metal surface after an etch, e.g., a nitric acid etch, or may be applied from a heated bath, for example, one heated up to 200°F. The metal-containing coating composition or the separate dispersion can contain up to, for example, about 5 weight percent of a surface active agent, and these can include dispersing agents, suspending agents, defoaming agents, and wetting agents, referred to herein for convenience simply as surface active agents. They may be present in as little as 0.001 weight percent.

Such agent may typically be a hydroxyl-containing hydrocarbon ether which includes the alkyl ethers of alkylene glycols, such as butyl ether of propylene glycol, the oxyalkyl ethers of alkylene glycols, e.g., 1-butoxyethoxy-2-propanol, fatty alcohol polyoxyalkylethers, alkylphenol polyoxyalkylethers such as polyoxyethylated nonylphenols, and polyalkylene glycols, e.g., tetraethylene glycol. Other suitable surface active agents which may be used include products prepared from waste sulfite liquors such as lignin sulfonic acids and products from pine wood distillation, e.g., pine oil.

With regard to the amount of pulverulent metal that is present on the surface of the substrate in the coating residue, such residues may typically contain as little as about 10–20 milligrams or less per square foot of pulverulent metal. However, residues can contain substantially more pulverulent metal, e.g., 600–700 milligrams per square foot of such metal, and the substrate may contain up to about 5,000 milligrams per square foot of pulverulent metal, whereas an excess of that amount is usually uneconomical.

It can be appreciated that the present invention is directed to coatings wherein there is an excess of pulverulent metal to chromium, even at the lesser concentrations of the metal. Generally, the coating should have a weight ratio of chromium, expressed as chromium and not $CrO_3$, to pulverulent metal of less than about 0.5:1, and, such ratio is most usually for the less heavy coating weights, since as the coating weights approach, for example, 5,000 milligrams per square foot of pulverulent metal, the weight ratio of chromium to pulverulent metal will be less than about 0.2:1. It has also been found that for coil coating, the weight ratio of chromium, expressed as chromium and not $CrO_3$, to pulverulent metal will preferably be in the range of between about 0.5:1–0.04:1, for economy and efficiency, with the weight for the metal in the coating residue being typically below about 2,000 milligrams per square foot of coated substrate. For coating small parts, i.e., parts smaller than coils, which can be final products that will not be normally subjected to subsequent forming, and where coating weights may approach 5,000 milligrams per square foot of pulverulent metal, the weight ratio of chromium to pulverulent metal in the coating may be as low as about 0.02:1.

Before starting the treatment of the present invention it is, in most cases advisable to remove foreign matter from the metal surface by thoroughly cleaning and de-greasing. Degreasing may be accomplished with known agents, for instance, with agents containing sodium metasilicate, caustic soda, carbon tetrachloride, trichlorethylene, and the like. The use of a commercial alkaline cleaning composition which combines washing and mild abrasive treatments can be employed for cleaning, e.g., an aqueous trisodium phosphate-sodium hydroxide cleaning solution. In addition to cleaning, the substrate can undergo cleaning plus etching, for example, with a hydrofluoric acid etching agent.

The intermediate coated substrate which is further topcoated with the composition topcoating may also form a particularly suitable substrate for paint deposition by electrocoating. This application may be used with metal substrates as well as other substrates, e.g., polysulfones and other synthetic polymer surfaces, which can withstand curing of the applied coating composition, typically at a temperature as low as about 300°F. or less for compositions in a t-butyl alcohol medium, or a more elevated temperature cure of 350°–400°F., or more, for compositions in aqueous medium.

The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Of particular interest are polycarboxylic acid resins which can be solubilized with polyfunctional amino compounds and include the siccative oil-modified polybasic acids, esters or anhydrides which can be further reacted with divinyl benzene for example or acrylic acid and esters as well as polymerizable vinyl monomers. Such mention of suitable baths for electrodeposition is made herein by way of example and should not be construed as limiting. More exhaustive discussions of such film-forming systems have been set forth, for example, in U.S. Pat. Nos. 3,304,250 and 3,455,805.

Also, substances of particular interest, for example in the automotive industry, are the anodically deposited film-forming materials which have gained considerable acceptance in this field and are exemplified by U.S. Pat. No. 3,230,162. However, the broad scope to which the electrodeposition of such materials on anodic or cathodic substrates, and by means of various techniques for passage of current through a bath, including even intermittent pulsed current. After electrodeposition and removal of the coated substrate from the bath, curing of the film-forming materials is performed. The time and temperature of curing will be dependent upon the film-forming materials present, but is typically an air cure at room temperature or a forced cure at a temperature up to 500°F. and for times up to 60 minutes, at more reduced temperatures.

After coating by any of the methods of the present invention, the resulting coated substrate can be further topcoated with any suitable paint, i.e., a paint, primer, enamel, varnish, or lacquer. Such paints may contain pigment in a binder or can be unpigmented, e.g., generally cellulose lacquers, rosin varnishes, and oleoresinous varnishes, as for example tung oil varnish. The paints can be solvent reduced or they may be water reduced, e.g., latex or watersoluble resins, including modified or soluble alkyds, or the paints can have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints. The paints may be applied as mill finishes.

The following example shows a way in which the invention has been practiced but should not be construed as limiting the invention. In the example the following procedures have been employed.

PREPARATION OF TEST PANELS

Steel test panels (4 inches × 12 inches, and all being cold rolled, low carbon steel panels) are typically prepared for subsequent treatment by immersing in water which has incorporated therein 2–5 ounces of cleaning solution per gallon of water. The cleaning solution is typically 75 percent by weight of potassium hydroxide and 25 weight percent tripotassium phosphate. The bath is maintained at a temperature of about 150°–180°F. After the cleaning treatment the panels are rinsed with warm water.

CORROSION RESISTANCE TEST (ASTM B–117–64)

Corrosion resistance of coated panels is measured by means of the standard salt spray (fog) test for paints and varnishes, ASTM B–117–64. In this test, the test panels are placed in a chamber kept at constant temperatures where they are exposed to a fine spray (fog) of a 5 percent salt solution for specified periods of time, rinsed in water and dried. The extent of corrosion and film removal on the test panels are then compared one with the other by visual inspection.

COIN ADHESION

A freshly minted, i.e., uncirculated, nickel coin is firmly held in vise-grip pliers; the pliers are manually held in a position such that a portion of the rim of the nickel coin contacts the coated substrate at about a 45° angle. The nickel coin is then drawn down across the panel for about two inches. The type of coating flaking and/or chipping is evaluated qualitatively by visual observance, and panels are compared with the condition of a standard test panel.

CONDENSING HUMIDITY TEST

In this test water is heated in the bottom of a cabinet to produce a condition of 100 percent humidity in the cabinet and a temperature for the ambient steam within the cabinet of 120°F. Panels are placed in the cabinet at about a 15° angle to the water surface; the bottom edge of the panel is about 8 inches above the water surface, and the top edge about 10 inches above the water surface. To terminate the test, panels are removed for inspection at the times shown in the table below. Upon removal, panels are air dried and visually inspected for blisters and pinhole rust spots on the face of the panel, that is, not around the panel edges. Results are reported as that portion of the total panel face, in percent which exhibits red rust and blister coating failure.

PAINT FILM

The paint film referred to in the examples is a commercial white alkyd enamel topcoat typically applied by dip-coating panels into the enamel. This paint is prepared from a modified alkyd resin based upon a system of partially polymerized phthalic acid and glycerine. The paint contains 50 weight percent solids and has a viscosity of 50 seconds as measured on a No. 4 Ford cup at 70°F. After coating panels with the enamel, the coating is cured by baking in a convection oven for 20 minutes at a temperature of 320–325°F.

EXAMPLE

Test panels are prepared as described above and are coated with a coating composition containing 40 g./l. (grams per liter) of $CrO_3$, 15 g./l. of succinic acid, 7.5 g./l. of succinimide, and 0.5 g./l. of polyoxyethylated nonylphenol, hereinafter referred to as the "C/S" composition. The panels are coated by dipping into this coating composition, removing and draining excess composition from the panel. Two zinc dust spray dispersions are prepared each containing 0.3 g./l. of lignin sulfonic acid dispersing agent and one containing 200 g./l. of zinc dust and the other 500 g./l. zinc dust. One panel containing air-dried coating composition is set aside and each of the remaining panels are sprayed, while wet, with one of the spray dispersions as shown in the table below, from a DeVilbiss paint spray gun (Type JGA 502) calibrated to deliver 1–3 milliliters of water in 5 seconds at 35 pounds air pressure per square inch. Achieved coating weights for the zinc (in milligrams per square foot of panel surface) are shown in the table below along with the average particle size of the zinc. After application of this pulverulent zinc, all panels containing coating composition including the zinc-free panels which have been set aside during spraying, are baked under infrared lamps at a substrate temperature of up to 450°F. for a time up to 1 minute.

One pulverulent-zinc-containing panel is then set aside, as indicated in the table below, and the balance of the panels including the zinc-free panel containing only the residue from the above-described coating composition, are coated again by dipping the panels into the coating composition described hereinbefore, removing and draining excess composition from the panels, and air drying the panels at room temperature until the coating is dry to the touch. All of these subsequently coated panels are then baked under infrared lamps in the manner described hereinbefore. For convenience, the zinc-free panel containing the coating composition residue undercoating as well as the coating composition residue topcoating is identified in the table below as the "Standard C" panel.

In the table below, results are also reported for a panel containing first the residue from only one coating of C/S composition. Also, a comparative panel is coated first with a chromic acid/adipic acid/succinimide composition containing these substituents in the following amounts, respectively, in g./l., 40:20:10. Both panels, free from zinc dust, are coated and the coatings cured in the manner described hereinabove.

These two panels, as well as some zinc-containing panels, as indicated in the table below, are coated with the alkyd enamel and the resulting coatings cured, as described hereinbefore. The first above-described panel is identified in the table below as the "Standard A" panel, and the other is identified as the "Standard B" panel. These standard panels are included as a basis for comparison with the pulverulent-zinc-containing panels. In the table, results are reported for the coin adhesion and the corrosion resistance (salt spray) test, each of which has been described hereinbefore.

TABLE

| Zinc dust | | | | | |
|---|---|---|---|---|---|
| Average particle size | Spray conc., g./l. | Weight on panel; mg./ sq.ft. | Paint topcoating | Coin adhesion | Salt spray |
| None—Standard A panel | | | Alkyd | Fair | |
| None—Standard B panel | | | do | do | 91.5 hrs., 5%. |
| None—Standard C panel | | | None | | 16 hrs., first rust, 184 hrs., 11%. |
| 2.9 | 200 | 30 | Alkyd | Fair-good | |
| 1.63 | 200 | 130 | do / None | Excellent | 1,036 hrs., 0%. |
| 2.9 | 200 | 240 | Alkyd | Good-excellent | |
| 2.9 | 200 | 80 | None | | 112 hrs., less than 1%. |
| 2.9 | 200 | 150 | do | | 112 hrs., 0%. |
| 2.9 | 500 | *480 | do | | 329 hrs., more than 2%. |
| 2.9 | 500 | 480 | do | | 690 hrs., 0%. |

*No coating composition topcoating.

The above results clearly show the desirably enhanced paint adhesion obtained for the pulverulent-metal-containing coating compositions of the present invention. Additionally, such compositions readily achieve excellent corrosion resistance as determined by the salt spray test, even by comparison with a painted panel, i.e., the Standard B panel.

The Standard C panel, containing both a first coating and a second coating of the above-described coating composition, but which panel is zinc-free, exhibits red rust corrosion over 11 percent of the panel surface area in 184 hours. The zinc-containing panel having 480 milligrams per square foot of the pulverulent zinc and a first coating of the coating composition exhibits, in 329 hours, red rust over more than 2 percent of the panel surface area. But, the like panel containing 480 milligrams per square foot of pulverulent zinc and having both a first coating and a second coating of the coating composition exhibits no corrosion on the panel face in 690 hours of salt spray testing.

Moreover, such panels containing lesser metal powder weights, e.g., 130 milligrams per square foot and higher, can be virtually free from red rust corrosion for up to more than 1,000 hours, thus far surpassing the corrosion protection obtainable from pulverulent-metal-free coatings or even for pulverulent-metal-containing coatings but which coatings are not subsequently topcoated with an additional coating composition.

Additional panels, prepared as described hereinabove with the C/S composition are, while still wet, coated in the above-described manner to contain 200 milligrams per square foot of zinc dust having an average particle size of 2.9 microns. These panels are then cured in the above-described manner, recoated with additional C/S composition, and cured in the manner shown hereinbefore.

These panels are then subjected to electrical resistance spot welding performed with Class 2 copper electrodes at an electrode pressure of 550 pounds using a weld time of 11 cycles based on a 60 cycle frequency and at a weld heat of 11,000 amp-sec. During such welding, the welded substrate pulls an acceptable "button" in the peel test. In this peel test, two coupons (panels) which have been welded together by at least one spot weld are peeled apart past the weld, thereby tearing the welded spot from one of the coupons. Hence, one coupon has a hole at the place of the spot weld and the other coupon has a "button" of metal, at the place of the spot weld. The electrodes for the welding are circular and have a diameter of 0.250 inch. The buttons pulled from the initial test coupons, measured across their narrowest apparent diameter with a micrometer calliper calibrated for measuring to the nearest 0.001 inch, must be virtually 0.250 inch across. Additionally, buttons measured in the same manner as the test approaches 2,000 spot welds must measure at least 0.220 inch across. In view of the pulling of acceptable buttons through 2,000 spot welds, such panels are considered to be highly suitable for electrical resistance spot welding.

It is to be understood that, although the invention has been described with specific reference to particular embodiments thereof, it is not to be so limited, since changes and alterations therein may be made which are within the full intended scope of this invention as defined by the appended claims.

I claim:

1. A metal substrate having on the surface thereof an adherent, corrosion-resistant coating which comprises:
   1. an undercoating comprising not substantially above about 500 milligrams per square foot of chromium in a coated metal substrate residue from a hexavalent-chromium-containing coating composition for metal substrates containing hexavalent-chromium-providing substance and reducing compound therefor, said residue being in intimate mixture with at least about 10 milligrams per square foot of coated metal substrate of pulverulent metal selected from the group consisting of zinc, manganese, aluminum, magnesium, mixtures thereof, and alloys of same; and 2. a topcoating on said undercoating which topcoating is a substantially resin-free and pulverulent-metal-free coating comprising not substantially above about 500 milligrams per square foot of chromium in a coated metal substrate residue from a hexavalent-chromium-containing coating composition for metal substrates, said composition further supplying said residue with above about 5 milligrams per square foot of coated metal substrate of chromium;

wherein the residue of said undercoating and the residue of said topcoating are established by heating said substrate at a temperature, and for a period of time, sufficient to vaporize volatile substituents from said coating compositions.

2. The coated metal substrate of claim 1 wherein said pulverulent metal has an average particle size not substantially above about 100 mesh and is present on said surface in an amount not substantially above about 5,000 milligrams per square foot.

3. The coated metal substrate of claim 1 wherein said residue of said undercoating and said residue of said topcoating are each the residue remaining after heating an applied hexavalent-chromium-containing coating composition containing between about 0.25–50 weight percent of hexavalent chromium expressed as $CrO_3$ at a temperature not substantially above about 300°C. and for a time of at least about 2 seconds.

4. The coated metal substrate of claim 1 wherein said undercoating contains a weight ratio of chromium to pulverulent metal not substantially above about 0.5:1.

5. The method of preparing a coated metal substrate having an adherent, corrosion-resistant coating at the surface of said substrate which method comprises:

1. applying to said surface a hexavalent-chromium-containing coating composition for metal substrates containing hexavalent-chromium-providing substance and reducing compound therefor, in an amount sufficient to provide a composition residue containing not substantially above about 500 milligrams per square foot of chromium;

2. providing said surface with at least about 10 milligrams per square foot of coated substrate of pulverulent metal selected from the group consisting of zinc, manganese, aluminum, magnesium, mixtures thereof, and alloys of same, while permitting the coated substrate to dry and thereby establish a dry, intermediate coated substrate of an intimate mixture of said pulverulent metal and dry coating composition residue;

3. applying to the resulting coated surface a substantially resin-free and pulverulent-metal-free hexavalent-chromium-containing coating composition for metal substrates in an amount sufficient to provide a composition residue containing from about 5, to not substantially above about 500, milligrams per square foot of chromium; and 4. heating said substrate at a temperature, and for a period of time, sufficient to vaporize volatile substituents from applied coating composition and deposit on said surface a heated composition residue.

6. The method of claim 5 wherein said pulverulent metal is applied to said surface as a dispersion of said metal in volatile liquid and said dispersion is applied to the surface after the application of said coating composition in step (1).

7. The method of claim 5 wherein said pulverulent metal is applied to said surface along with the application of said coating composition in step (1) and said dry, intermediate coated substrate is established by heating said substrate at a temperature not substantially above about 300°C. and for a time of at least about 2 seconds.

8. The method of claim 5 wherein said pulverulent metal is applied as a dry powder to said surface, said metal is applied prior to the application of said coating composition in step (1), and said dry, intermediate coated substrate is established without heating sufficient to prepare a heated composition residue.

9. The method of claim 5 wherein said providing of pulverulent metal and said application of coating composition of step (1) provide a dry intermediate coating containing a weight ratio of chromium to pulverulent metal not substantially above about 0.5:1.

10. The method of preparing a weldable substrate for electrical resistance welding and having desirable corrosion resistance, which method comprises:

1. coating on the surface of said substrate, on at least a portion thereof where welding will take place, from about 5, to not substantially above about 500, milligrams per square foot of chromium in a coated metal substrate residue from a substantially resin-free hexavalent-chromium-containing coating composition containing a hexavalent-chromium-providing substance and reducing agent therefor, said residue being in intimate mixture with from about 10, to not substantially above about 5,000, milligrams per square foot of coated substrate, of pulverulent metal selected from the group consisting of zinc, manganese, aluminum, magnesium, mixtures thereof, and alloys of same, to provide a coating with a weight ratio of chromium to pulverulent metal not essentially in excess of about 0.5:1, thereby establishing a treated metal surface;

2. coating on the resulting treated metal surface a substantially resin-free and pulverulent-metal-free topcoat composition comprising the residue from a hexavalent-chromium-containing coating composition for metal substrates and providing above about 5, to not substantially above about 25, milligrams per square foot of coated metal substrate of chromium in said topcoat composition; and, 3. curing said topcoat composition thereby preparing said substrate for welding with a coating providing corrosion resistance and weldable electroconductivity.

11. The method of claim 10 wherein said treated metal surface is at least in part established by drying said substrate and said substrate after establishing said topcoat composition thereon is heated at a temperature not substantially in excess of about 300°C. and for a time of at least about 2 seconds.

12. A weldable metal substrate prepared for electrical resistance welding according to the method of claim 10.

13. The method of preparing a coated and welded metallic article, wherein the welding is electrical resistance welding which method comprises:
   1. coating on at least one article, and on at least a portion of the surface of said article where welding will take place, from about 5, to not substantially above about 500, milligrams per square foot of chromium in a coated metal substrate residue from a substantially resin-free hexavalent-chromium-containing coating composition containing a hexavalent-chromium-providing substance and reducing agent therefor, said residue being in intimate mixture with from about 10 to not substantially above about 5,000 milligrams per square foot of coated substrate of pulverulent metal selected from the group consisting of zinc, manganese, aluminum, magnesium, mixtures thereof, and alloys of same, to provide a coating with a weight ratio of chromium to pulverulent metal not essentially in excess of about 0.5:1, thereby establishing a treated metal surface;
   2. coating on the resulting treated metal surface a substantially resin-free and pulverulent-metal-free topcoat composition comprising the residue from a hexavalent-chromium-containing coating composition for metal substrates and providing above about 5, to not substantially above about 25, milligrams per square foot of coated metal substrate of chromium in said topcoat composition; and,
   3. curing said topcoat composition thereby preparing said substrate for welding with a coating providing corrosion resistance and weldable electroconductivity;
   4. contacting at least a portion of said one article with another article of metal to be welded;
   5. passing an electrical resistance welding current through said articles of metal and said coating thereon at the zone selected for welding; and
   6. fusing said articles together in said zone of said welding.

14. A welded article prepared according to the method of claim 13.

15. The method of preparing a substrate for receiving a deposition of electrocoat paint, which method comprises:
   1. coating on the surface of said substrate, from about 5, to not substantially above about 500 milligrams per square foot of chromium in a coated metal substrate residue from a substantially resin-free hexavalent-chromium-containing coating composition containing a hexavalent-chromium-providing substance and reducing agent therefor, said residue being an intimate mixture with from about 10, to not substantially above about 5,000, milligrams per square foot of coated substrate of pulverulent metal selected from the group consisting of zinc, manganese, aluminum, magnesium, mixtures thereof, and alloys of same, to provide a coating with a weight ratio of chromium to pulverulent metal not essentially in excess of about 0.5:1, thereby establishing a treated metal surface;
   2. coating on the resulting treated metal surface a substantially resin-free and pulverulent-metal-free topcoat composition comprising the residue from a hexavalent-chromium-containing coating composition for metal substrates and providing above about 5, to not substantially above about 25 milligrams per square foot of coated metal substrate of chromium in said topcoat composition; and,
   3. curing said topcoat composition thereby preparing an electroconductive, coated substrate for receiving deposition of electrocoat paint thereon.

16. The method of preparing an article having a coating of electrocoat paint, wherein the substrate surface of the article is treated to receive the deposition of said paint, which method comprises:
   1. coating on the surface of said substrate, from about 5, to not substantially above about 500 milligrams per square foot of chromium in a coated metal substrate residue from a substantially resin-free hexavalent-chromium-containing coating composition containing a hexavalent-chromium-providing substance and reducing agent therefor, said residue being in intimate mixture with from about 10, to not substantially above about 5,000, milligrams per square foot of coated substrate of pulverulent metal selected from the group consisting of zinc, manganese, aluminum, magnesium, mixtures thereof, and alloys of same, to provide a coating with a weight ratio of chromium to pulverulent metal not essentially in excess of about 0.5:1, whereby establishing a treated metal surface;
   2. coating on the resulting treated metal surface a substantially resin-free and pulverulent-metal-free topcoat composition comprising the residue from a hexavalent-chromium-containing coating composition for metal substrates and providing above about 5, to not substantially above about 25 milligrams per square foot of coated metal substrate of chromium in said topcoat composition; and
   3. curing said topcoat composition thereby preparing an electroconductive, coated substrate for receiving deposition of electrocoat paint thereon;
   4. immersing into a bath of electrocoat paint containing an electrode the resulting treated surface and preparing same as an electrode; and
   5. electrolyzing said bath of electrocoat paint.

17. An electrocoated article prepared by the process of claim 16.

18. The method of preparing a corrosion resistant, welded metal assembly having an electrocoat painted surface, which method comprises:
   1. coating on at least one article, and on at least a portion of the surface of said article where welding will take place, from about 5, to not substantially above about 500 milligrams per square foot of chromium in a coated metal substrate residue from a substantially resin-free hexavalent-chromium-containing coating composition containing a hexavalent-chromium-providing substance and reducing agent therefor, said residue being in intimate mixture with from about 10, to not substantially above about 5,000, milligrams per square foot of coated substrate of pulverulent metal selected from the group consisting of zinc, manganese, aluminum, magnesium, mixtures thereof, and alloys of same, to provide a coating with a weight ratio of chromium to pulverulent metal not essentially in excess of about 0.5:1, thereby establishing a treated metal surface;
2. coating on the resulting treated metal surface a substantially resin-free and pulverulent-metal-free topcoat composition comprising the residue from a hexavalent-chromium-containing coating composition for metal substrates and providing above about 5, to not substantially above about 25 milligrams per square foot of coated metal substrate of chromium in said topcoat composition; and
3. curing said topcoat composition thereby preparing said substrate for welding with a coating providing corrosion resistance and weldable electroconductivity;
4. contacting at least a portion of the article having the prepared substrate with another article of metal to be welded;
5. passing an electrical resistance welding current through said articles of metal and said coating thereon at the zone selected for welding, and fusing said articles together at said zone of welding, thereby forming said welded metal assembly.
6. immersing into a bath of electrocoat paint containing an electrode the resulting assembly and preparing same as an electrode; and
7. electrolyzing said bath of electrocoat paint.

19. A welded and electrocoated assembly prepared by the process of claim 18.

* * * * *